US006581009B1

(12) United States Patent  
Smith (10) Patent No.: US 6,581,009 B1  
(45) Date of Patent: Jun. 17, 2003

(54) QUANTITATIVE PRECIPITATION PREDICTION METHOD

(75) Inventor: Michael R. Smith, Wichita, KS (US)

(73) Assignee: User-Centric Enterprises, Inc., Wichita, KS (US)

( * ) Notice: Subject to any disclaimer, the term of this patent is extended or adjusted under 35 U.S.C. 154(b) by 16 days.

(21) Appl. No.: 10/032,452

(22) Filed: Jan. 2, 2002

(51) Int. Cl.[7] .......................... G01W 1/00; G06F 19/00; G06F 169/00
(52) U.S. Cl. .......................................................... 702/3
(58) Field of Search ........................ 702/3, 4; 342/26; 706/931

(56) References Cited

U.S. PATENT DOCUMENTS

| | | | |
|---|---|---|---|
| 5,379,215 A | | 1/1995 | Kruhoeffer et al. |
| 5,406,481 A | | 4/1995 | Shinozawa et al. |
| 5,440,483 A | | 8/1995 | Badoche-Jacquet et al. |
| 5,696,671 A | | 12/1997 | Oliver |
| 5,717,589 A | * | 2/1998 | Thompson et al. ............ 702/3 |
| 5,839,089 A | | 11/1998 | Yasuda et al. |
| 5,850,619 A | | 12/1998 | Rasmussen et al. |
| 5,959,567 A | * | 9/1999 | Wolfson et al. ............... 342/26 |
| 5,974,360 A | | 10/1999 | Otsuka et al. |
| 6,018,699 A | * | 1/2000 | Baron et al. .................... 702/3 |
| 6,081,220 A | * | 6/2000 | Fujisaka et al. ............... 342/26 |
| 6,128,578 A | * | 10/2000 | Sakaino et al. ................ 702/3 |

* cited by examiner

Primary Examiner—Donald E. McElheny, Jr.
(74) Attorney, Agent, or Firm—Banner & Witcoff, Ltd.

(57) ABSTRACT

A user-selectable cursor can be positioned over a portion of a cloud formation displayed on a computer display, where the portion corresponds to precipitation that is expected to move over a target point or area. Predicted precipitation amounts corresponding to the portion are calculated and displayed, allowing the user to see how much precipitation is expected to occur over the target point or area. In one variation, radar reflectivity data indicating relative storm intensities is displayed on the computer screen, and the cursor is used to select a region of interest including one or more cells that are expected to move over a target area. Reflectivity values for each cell that is expected to move over the target area are converted into predicted precipitation rates, and are multiplied by the time that each cell is expected to remain over the target area. Predicted precipitation amounts attributable to each cell that is expected to move across the target area are accumulated and output as a predicted precipitation amount for the target area. If the target area is a watershed comprising multiple cells, then predicted precipitation amounts for each cell in the watershed are averaged to produce a predicted precipitation amount for the watershed. The cursor can be drawn over different regions of interest to allow a user to quickly identify outcomes under different scenarios.

37 Claims, 6 Drawing Sheets

QUANTITATIVE PRECIPITATION PREDICTION METHOD

FIELD OF THE INVENTION

The invention relates generally to weather forecasting and warning systems. More particularly, the invention provides a method and apparatus for predicting precipitation over a given geographic region, watershed, or point.

BACKGROUND OF THE INVENTION

Weather prediction techniques have improved greatly in recent years. As weather predictions have become more accurate, businesses have incorporated weather-related analysis into their corporate planning decisions. Information concerning tornadoes, hurricanes, severe thunderstorms and the like have been used by utility companies, manufacturing plants, airlines, and other businesses to avoid losses and to reroute vehicles such as airplanes and trucks. Government agencies, school districts, and other entities also rely on accurate weather information to decide whether to open late or take other action.

Weather-related warnings provided by the National Weather Service and other providers are broadcast over television, radio, and other communication channels to warn residents and businesses of short-term events, such as flash flooding. One problem with such warnings is that they are often provided for areas that are too broad (e.g., an entire county), thus wasting resources by unduly warning those who may not be at risk. Part of this "overwarning" problem is due to the current inability of meteorologists to make accurate short-term (e.g., 5 minutes to 3 hours) forecasts of precipitation over a given point, watershed, or other geographic area. Predicting future precipitation accurately to generate flash flood warnings has proven to be particularly difficult.

In the late 1940s Marshall and Palmer quantified a standard relationship between the rate of rainfall (R) and the reflected energy from a storm as measured by radar (Z), more commnonly referred to as the storm's intensity. Intensity is measured in decibels (dB) of reflected power. The units of radar reflectivity are abbreviated as dBZ.

The well-known Marshall-Palmer relationship predicts the rate of rainfall from a given cloud formation as a function of the cloud's radar reflectivity, and is generally given by the relationship $Z=200R^{1.6}$, where Z is the reflectivity and R is the rainfall rate in millimeters per hour. More generally, the relationship is given by $Z=aR^b$, where a and b are adjustable parameters depending on various factors. As an example, a storm returuing 50 dBZ on a WSR-88D radar will produce 2.5 inches of rain per hour, using the standard Z/R relationship for a WSR-88D radar. If this echo stays over a rain gauge for, 30 minutes, it will produce 1.25 inches of rain at the rain gauge.

It is known that the Marshall-Palmer relationship, to be usefull, should be adjusted for the air mass (e.g., a 40 dBZ echo in a summer tropical air mass will produce a much higher rate of rainfall than in a winter continental air mass); time of year; and melting level (i.e., the height of the 32 degree temperature above the ground). For example, as snowflakes fall from below freezing to above freezing temperatures, they melt from the outside in. For the few minutes where the ice crystal has a wet outer coating it is highly reflective and gives a falsely high rate of rainfall estimate when viewed in raw, uncorrected radar data. An appropriate Z/R relationship in a given situation can be selected from several published values, or it can be estimated on the fly by using one or more rain gauges to calculate the rate of rain at the gauge that is associated with the radar echoes that were passing over the gauges.

Meteorologists take advantage of this knowledge by summing the cumulative Z/R relationship over each pixel of a radar screen over varying periods of time. This produces a map of estimated precipitation for, say, one hour or three hour periods or even a "storm total" precipitation sum (i.e., the amount of precipitation since precipitation first appeared on the radar screen until the last of the precipitation ends).

However, known systems for estimating precipitation from radar are retrospective. That is, they estimate the amount of precipitation that has already fallen; they do not estimate the rain that is yet to fall.

There are generally two techniques for quantitative precipitation forecasting: Analog processes (for example, W. Smith and R. Younkin, "An Operationally Useful Relationship Between the Polar Jet Stream and Heavy Precipitation," 1972) dating back to the 1970s; and computer modeling using equations of the atmosphere that attempt to dynamically estimate precipitation amounts.

While both techniques are capable of providing moderately reliable forecasts over a broad geographic area (say, half of the State of Kansas) a day or two ahead of the event, they are virtually useless when trying to forecast the rainfall at a specific location or over a small to medium size watershed. This is because the output of both analog and dynamic models is far too smoothed to be of use in small geographic areas.

This shortcoming is especially important as hydrologists create computer models of small streams and rivers with increasing resolution and speed. Use of these models has been hampered because of the inability to input predicted rainfall information of sufficient accuracy and, in particular, to forecast predicted rainfall over the stream or river basin in question. Although the same amount of precipitation may fall over two different areas in the same county, one area may flood, whereas the other may not, depending on the hydrologic characteristics (e.g., topography, amount of paved surface, and other factors) in each area.

Hydrologists have bemoaned the fact that short-term quantitative precipitation forecasts have not been useful with mesoscale hydrologic models, which might allow more accurate forecasts for flash floods. Consequently, there has been no easy way to apply rainfall predictions to a particular area having certain hydrologic characteristics.

SUMMARY OF THE INVENTION

The invention overcomes various shortcomings described above. In one embodiment, a user-selectable cursor can be positioned over a portion of a cloud formation displayed on a computer display, where the portion corresponds to precipitation that is expected to move over a target point or area. Predicted precipitation amounts corresponding to the portion are calculated and displayed, allowing the user to see how much precipitation is expected to occur over the target point or area.

In one embodiment, radar reflectivity data is provided for a geographic area, which may be broken up into cells. A user-selectable cursor is used to select a region of interest including one or more of the cells having corresponding precipitation that is expected to move over a target area. In one variation, the cursor can be shaped to correspond to the rivershed of a given stream or other geographic shape of interest. Reflectivity values for each cell having precipitation that is expected to move over the target area are converted into predicted precipitation rates, which are multiplied by the time that precipitation from each respective cell is expected to remain over the target area. Predicted precipitation amounts attributable to each cell are accumulated and output as a predicted precipitation amount for the target area. If the target area is a watershed comprising multiple cells, then predicted precipitation amounts for each cell in the watershed are averaged to produce a predicted precipitation amount for the watershed. The cursor can be drawn over different regions of interest to allow a user to quickly identify outcomes under different scenarios.

In some embodiments, the cells having precipitation that is expected to move over a target area can be determined according to various predictive methods (e.g., a "growth and decay" algorithm), rather than using a manual cursor. The inventive principles can be applied not only to precipitation amounts estimated from ground-based radar reflectivity, but to amounts estimated from infrared satellite imagery or other estimation methods.

In some embodiments, Z/R relationships can be estimated on the fly based on air mass or by using rain gauges to calculate the amount of rain that has fallen versus the reflectivity that has already passed over each gauge. Once the Z/R relationship for a given storm has been chosen, it makes it easy to calculate how much rain has already fallen over a given point or watershed and combine that calculation with a cursor-driven or predictive model forecast of how much rain is going to fall, so that the total storm precipitation can be estimated. Once the "storm total" is known, accurate and specific warnings can be created.

DETAILED DESCRIPTION OF THE INVENTION

Figure 1:
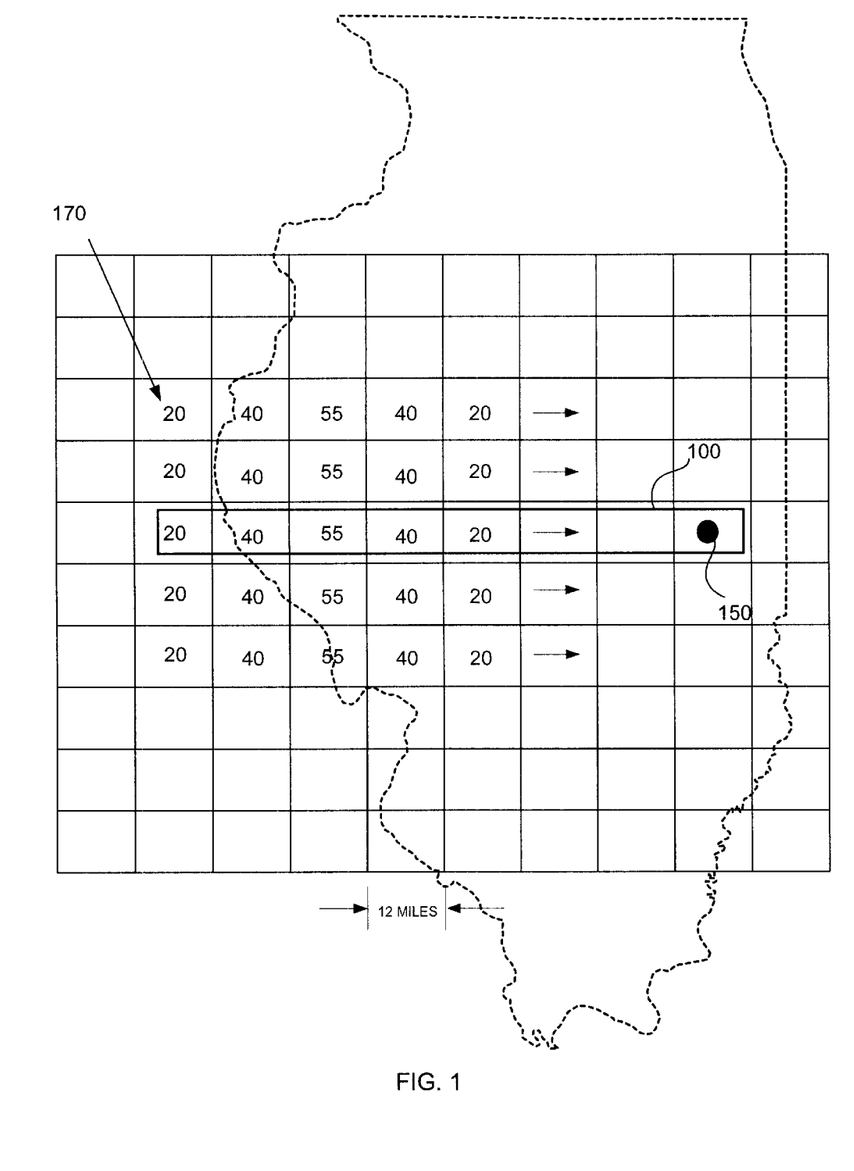
FIG. 1 shows a computer display including a plurality of reflectivity values 170 arranged into cells; a cursor covering a selected region of interest 100; and a target point area 150.

FIG. 1 shows a computer display on which is arranged a plurality of radar reflectivity values 170. Each number represents a reflectivity value in dBZ, and each value is shown in a particular cell, which may correspond to one or more pixels on the computer display. Instead of using radar reflectivity values, other cloud parameter values indicative of potential precipitation, such as infrared sensor measurements corresponding to cloud temperatures obtained from satellites or other sources, can be used. For purposes of illustration, it is assumed that each cell corresponds to a single pixel on the display, and each cell corresponds to a geographic area that corresponds to some distance (e.g., 12 miles) on each side.

The term "cell" is used broadly to refer to a geographic area with which one or more reflectivity values (or other cloud parameters indicative of potential precipitation) can be associated, and can take on various dimensions or values without departing from the inventive principles. In practice, the radar pixels are considerably smaller, in some cases as small as one-quarter nautical mile by one-quarter mile. Pixels obtained from satellite images can be as small as one-half mile by one-half mile.

As can be seen in FIG. 1, the reflectivity values form a storm moving from west to east, and include bands of intensity ranging from 20 dBZ on the left side, to a maximum band of 55 dBZ in the center, to 20 dBZ on the right side. A target area 150, which is assumed to be a point (e.g., a single rain gauge), will be hit by the moving storm area, as suggested by the arrows in FIG. 1. It is also assumed that the speed of the storm can be determined using conventional methods, such that the time that each cell "hits" target area 150 and the amount of time that each cell spends dumping precipitation on target area 150 can be determined. (Although the cells themselves do not actually move, this terminology is intended to refer to the fact that cloud formations over a particular cell will move and hit a target area due to storm movement. Therefore, terminology such as a cell "hitting" a target area should be understood to refer to the fact that precipitation associated with the cell will move and eventually hit the target area.)

Radar reflectivity data can be obtained in known formats from the WSR-88D radar, which provides various modes and coverage patterns, and produces data products representing radar reflectivity data and derivations thereof. One product produced by such a radar is referred to as a "composite reflectivity" value, which represents the highest reflectivity value above a given resolution element from any elevation angle of a volume scan. Other information for each geographical resolution element from the radar can include radar ID, time and date of the scan, radar position, elevation, and operational mode. The data can be converted from radial scan format into raster (e.g., rectangular) data for processing in accordance with the invention. The system can also use the National Weather Service's "digital precipitation array" or reflectivity data from sources other than the NWS as input.

Using reflectivity data (preferably WSR-88D Level II data with dBZ levels rather than pixels), the echoes of precipitation upstream of the rain gauge or target area 150 will be determined. In one embodiment, a user-selectable cursor 100 is used to select a region of interest that is upstream of the target area 150, and the expected precipitation attributable to this region of interest is determined.

As explained above, the precipitation rate attributable to a particular cell of a thunderstorm can be calculated according to the Marshall-Palmer relation, adjusted for various factors. In accordance with one variation of the present invention, the following default Z/R table, showing rainfall rates (inches per hour) for different reflectivity values obtained from a WSR-88D radar ($Z=300R^{1.4}$), can be used:

| dBZ | in/hr | dBZ | in/hr | dBZ | in/hr |
|-----|-------|-----|-------|-----|-------|
| 11  | 0.00  | 41  | 0.57  | 71  | 78.69 |
| 12  | 0.00  | 42  | 0.67  | 72  | 92.75 |
| 13  | 0.01  | 43  | 0.79  | 73  | 109.32 |
| 14  | 0.01  | 44  | 0.93  | 74  | 128.85 |

-continued

| dBZ | in/hr | dBZ | in/hr | dBZ | in/hr |
| --- | --- | --- | --- | --- | --- |
| 15 | 0.01 | 45 | 1.10 | 75 | 151.88 |
| 16 | 0.01 | 46 | 1.29 | 76 | 179.02 |
| 17 | 0.01 | 47 | 1.52 | 77 | 211.01 |
| 18 | 0.01 | 48 | 1.79 | 78 | 248.71 |
| 19 | 0.02 | 49 | 2.11 | 79 | 293.16 |
| 20 | 0.02 | 50 | 2.49 | 80 | 345.54 |
| 21 | 0.02 | 51 | 2.94 | | |
| 22 | 0.02 | 52 | 3.46 | | |
| 23 | 0.03 | 53 | 4.08 | | |
| 24 | 0.03 | 54 | 4.81 | | |
| 25 | 0.04 | 55 | 5.67 | | |
| 26 | 0.05 | 56 | 6.68 | | |
| 27 | 0.06 | 57 | 7.88 | | |
| 28 | 0.07 | 58 | 9.28 | | |
| 29 | 0.08 | 59 | 10.94 | | |
| 30 | 0.09 | 60 | 12.90 | | |
| 31 | 0.11 | 61 | 15.20 | | |
| 32 | 0.13 | 62 | 17.92 | | |
| 33 | 0.15 | 63 | 21.12 | | |
| 34 | 0.18 | 64 | 24.89 | | |
| 35 | 0.21 | 65 | 29.34 | | |
| 36 | 0.25 | 66 | 34.59 | | |
| 37 | 0.29 | 67 | 40.77 | | |
| 38 | 0.35 | 68 | 48.05 | | |
| 39 | 0.41 | 69 | 56.64 | | |
| 40 | 0.48 | 70 | 66.76 | | |

As explained below, rather than using a default table of values, one may be able to obtain more accurate Z/R values by taking measurements using rain gauges and correlating precipitation actually received with radar reflectivity values actually observed.

If each pixel value is 12 miles wide and the storm is moving east at 30 mph, then each pixel with its particular rate of rainfall will be over the rain gauge for 0.4 hours or 24 minutes (i.e., 12 miles divided by 30 mph is 0.4 hours). Because the target area is a point and the storm is moving east, the cells that are expected to cross the target area can be determined by moving a cursor 100 over cells directly to the west of the target area 150. Because the speed of the storm is known (e.g., 30 mph), the following calculations can be made to determine how much precipitation is expected to fall on target area 150 as the storm passes over it:

| [31] | First pixel west of the gauge = 20 dBZ ~ 0.02 inches/hour X.4 hours = | 0.01 inches |
| --- | --- | --- |
| [32] | 2nd pixel west of gauge = 40 dBZ ~ 0.48 inches/hour X.4 hours = | 0.19 inches |
| [33] | 3rd pixel west of gauge = 55 dBZ ~ 5.67 inches/hour X.4 hours = | 2.67 inches |
| [34] | 4th pixel west of gauge = 40 dBZ ~ 0.48 inches/hour X.4 hours = | 0.19 inches |
| [35] | 5th pixel west of gauge = 20 dBZ ~ 0.02 inches/hour X.4 hours = | 0.01 inches |
| [36] | Summed rainfall from the five pixels: | 3.07 inches |

If one wanted to know how much rain would fall in the next hour, and if one knew that the storm is moving at 30 mph, one would simply sweep the cursor 30 miles to the west and carry out the calculations above for the pixels falling within the cursor. If one wanted to know the total amount of precipitation yet to fall over target area 150, one would sweep the cursor as far west as the echoes extend. However, as distance increases from the radar site the accuracy of the estimate will decrease for a couple of reasons. First, storms change intensity over time. Second, the earth's curvature means that the storms are being sampled at progressively higher altitudes as the distance from the radar site increases. As the system samples higher in the storm, the sample may be less representative than near the ground. This latter problem can be mitigated by using a radar mosaic created from multiple radars rather than using a single radar.

Rather than using a polygon or other sort of shape as a cursor to select cells that are to be included in the region of interest, it is also of course possible to select cells by clicking on them or using some other indicator to identify individual cells that are to be considered as falling within the cursor or considered to be part of the region of interest. The predicted amount of precipitation can be displayed on a computer screen in various forms, such as numeric, bar graph, color coding schemes, and/or can be reported through electronic means to government agencies or any other destination through the Internet, fax lines, e-mail, or the like. The predicted precipitation amount can also be input into hydrologic models to predict flash flooding and other events based on the hydrologic characteristics of the watershed.

Because storm movement can vary, one could estimate the uncertainty in the estimate by making additional cursor samples. For example, if the storms were moving from the straight west (270 compass degrees), one could sweep at 260 and 280 degrees. The two additional sweeps would likely yield slightly differing results, which represent "error bars" on the rainfall prediction. This gives the user the option of choosing the mean result of the three sweeps; the sweep that yields the highest amount of predicted rainfall (for safety); the most likely amount; or some combination thereof.

Another aspect of the invention provides the ability to estimate an average or total precipitation over a watershed or other feature of any geometric shape. Assume for a moment that an estimate is needed over a rectangular watershed, as shown for example region 150 in FIG. 2.

Figure 2:
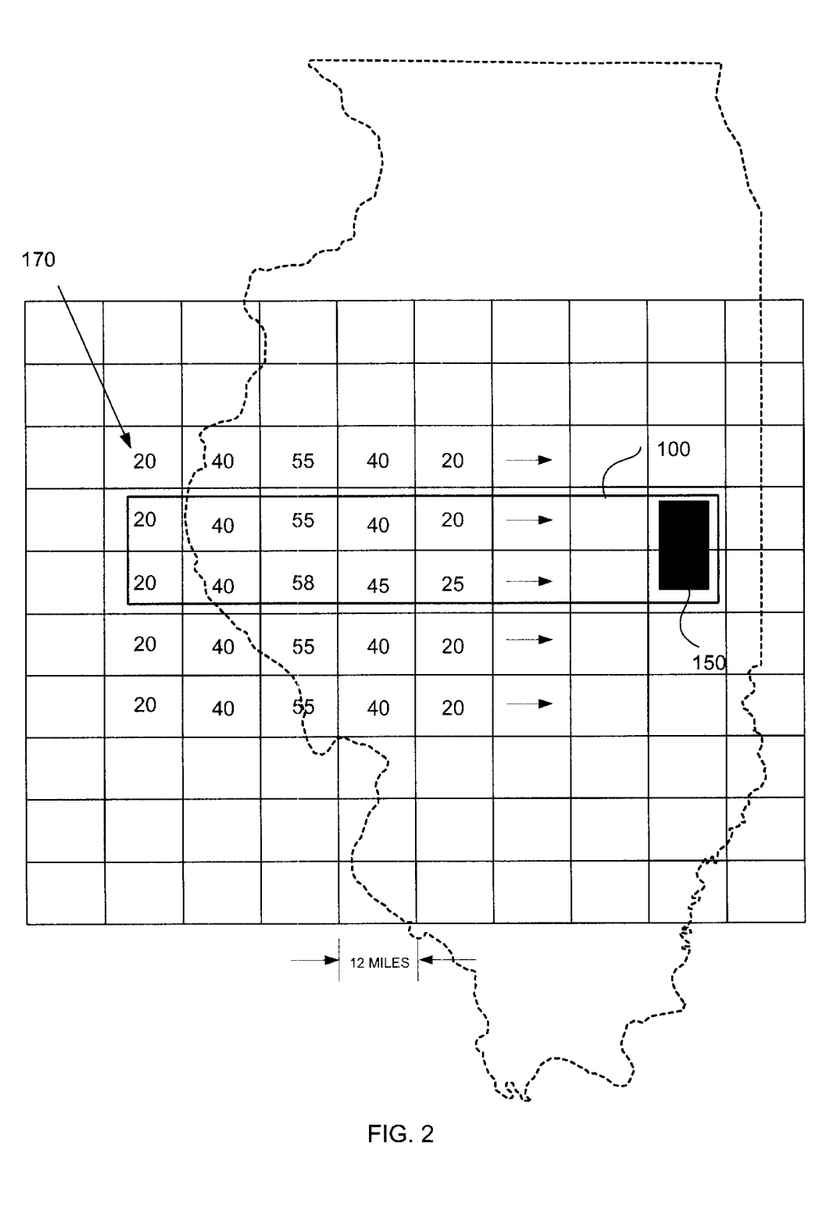
FIG. 2 shows a computer display similar to that of FIG. 1, where the target area is a watershed 150 covering two or more cells.

Instead of selecting a region that is a single cell wide, in this situation the user would select region 100 that is two rows wide. Assuming that the reflectivity values are different in the two rows (as shown in FIG. 2), the system would estimate the rainfall across the top row of pixels based on 20+40+55+40+20 dBZ (the earlier example yielded 3.07 inches) and across the bottom row, which would be:

| [42] | First pixel west of the gauge = 25 bdZ ~ 0.04 inches/hour X.4 hours = | 0.02 inches |
| --- | --- | --- |
| [43] | 2nd pixel west of gauge = 45 dBZ ~ 1.10 inches/hour X.4 hours = | 0.44 inches |
| [44] | 3rd pixel west of gauge = 58 dBZ ~ 5.67 inches/hour X.4 hours = | 3.71 inches |
| [45] | 4th pixel west of gauge = 40 dBZ ~ 0.48 inches/hour X.4 hours = | 0.19 inches |
| [46] | 5th pixel west of gauge = 25 dBZ ~ 0.02 inches/hour X.4 hours = | 0.02 inches |
| [47] | Summed rainfall from the five pixels: | 4.38 inches |
| [48] | The average rainfall over the watershed would be (3.07 + 4.38)/2 = 3.72 in. | |

The system can subdivide the watershed, if desired, to yield the range in values across the watershed or to compute the rainfall at strategically important locations within the watershed. For example, some river models are designed to use a small number of rain gauges as a proxy for the watershed as a whole. The system would know of this limitation of the model it is supporting and would calculate the rainfall for each of those points.

Figure 3A:
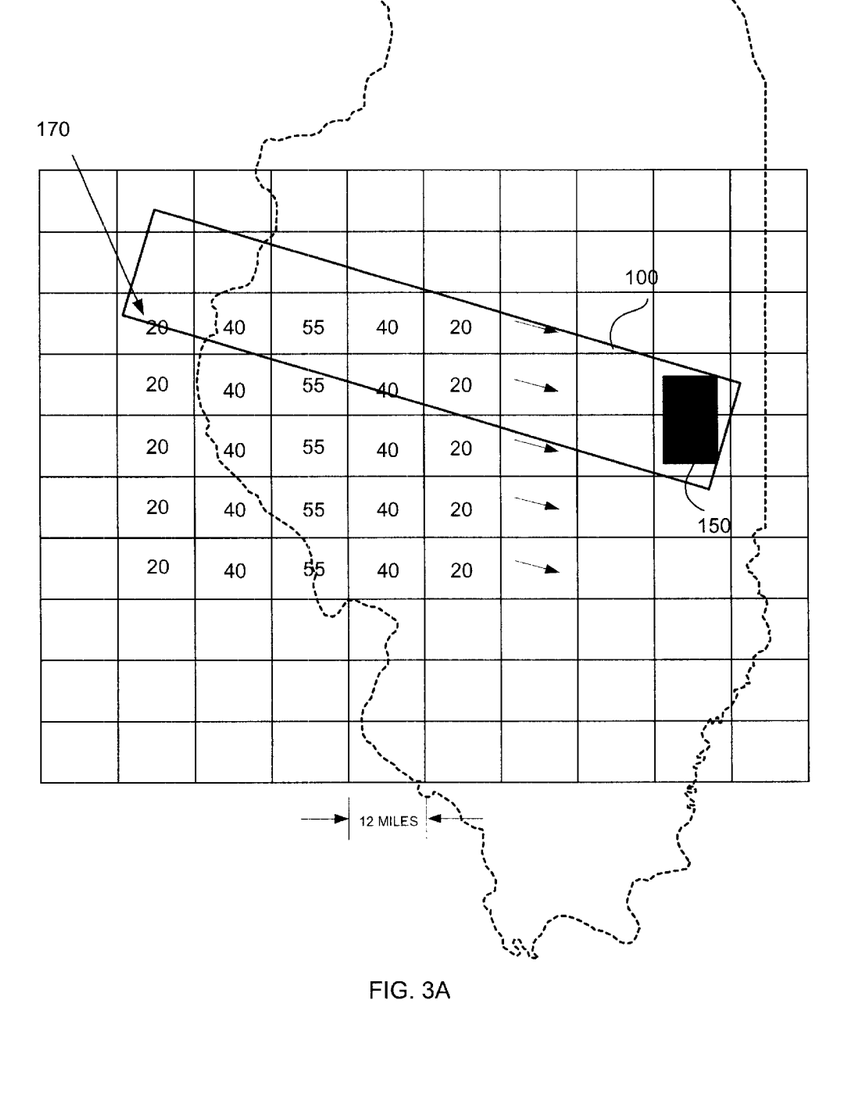
FIG. 3A shows a computer display similar to that of FIG. 1, where the cursor 100 is drawn at an angle parallel to a direction of the storm.

FIG. 3A shows yet another example in which a precipitation prediction is desired for watershed area 150, but the storm is moving at an angle (i.e., in the southeast direction). Accordingly, in this variation the cursor 100 is drawn diagonally to select cells that are parallel to the direction of storm travel, thus cutting across some cells. Cells that fall completely within cursor 100 can be used in the calculation while others are excluded. Alternatively, prorated or weighted values can be taken from cells that fall only partially within cursor 100 (e.g., a cell falling entirely within cursor 100 is fully valued, whereas other cells are only partially included to the degree to which they fall within the cursor area).

Figure 3B:
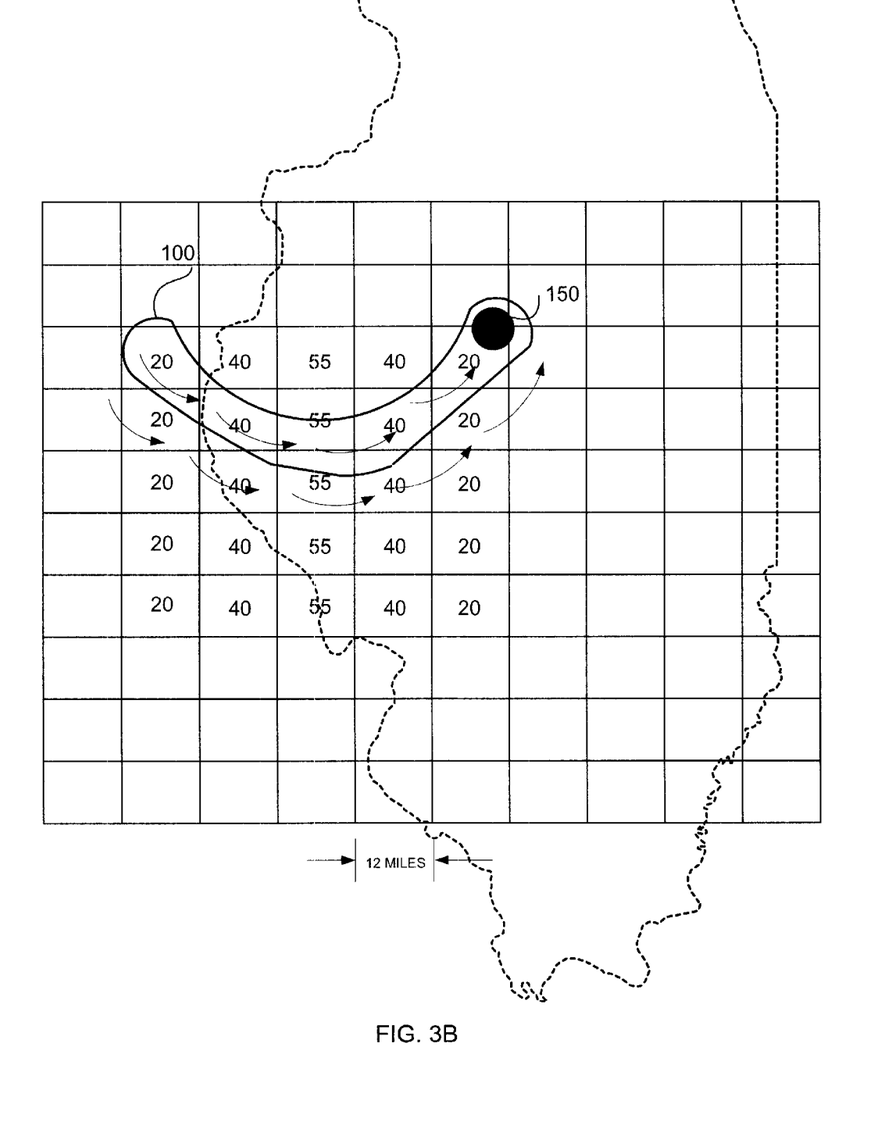
FIG. 3B shows a computer display similar to that of FIG. 1, where the cursor 100 is drawn in a curved shape that generally parallels a direction of part of the storm.

FIG. 3B shows another example in which a precipitation prediction is desired for watershed area 150, but the storm is moving in a generally circular direction, as indicated by the curved arrows. As is well known in meteorology, a low-pressure system in the upper atmosphere (e.g., 20,000 feet or so) can cause wind circulation around the low-pressure area. Examples include hurricanes, tropical storms, and intense extratropical low-pressure systems. Radar echoes from a storm that moves in accordance with the wind circulation will also generally follow the storm movement, causing areas of high radar reflectivity to move in a generally circular (or semi-circular) pattern. Consequently, according to one variation of the invention, a curved cursor 100 can be drawn on the computer display to correspond generally to the areas of the storm (and their corresponding radar reflectivity values) that are expected to travel over an area of interest, such as watershed 150. The total predicted precipitation would be calculated as above based on cells that fall within the curved cursor shape.

It should be recognized that cursors of various different shapes can be used, and that the inventive principles are not limited to the specific examples provided herein. Moreover, it should be apparent that the amount of predicted precipitation attributable to a particular cell or cursor-selected portion of a cell can be prorated or weighted in any of various ways to account for different objectives or arbitrary shapes. For example, in the case where a curved cursor is drawn that that covers half of several cells, the predicted precipitation attributable to each cell can be reduced to the extent that the cell does not fall completely within the cursor (e.g., 50% reduction where the cursor covers only half of the cell, and so forth). Conventional calculus and trigonometric techniques can be used to derive values from arbitrary shapes and orientations. Similar principles apply to the shape of the target area or watershed, such that the amount of precipitation can be averaged over an arbitrarily shaped watershed. This allows the output of the inventive system to be input to hydrologic models that predict flash flooding based on an arbitrarily-shaped watershed area.

According to another variation of the invention, instead of using a cursor 100 to select a region of interest, a predictive algorithm can be used to predict cells that will move over the target area, and the precipitation can be predicted based on those cells. One technique for predicting a future radar pattern is disclosed in U.S. Pat. No. 5,959,567, entitled "Method and Apparatus for Tracking of Organized Storms." According to this variation of the method, once a target area has been identified (e.g., a single cell), the method disclosed in the '567 patent can be used to predict which cells in the storm will move over the target area. Then, according to the invention, the amount of precipitation attributable to those cells can be determined.

The inventive principles can be used either with data from a single radar or using data from a mosiac radar image (i.e., the data from multiple radars combined into one). The same methodology can be adapted for precipitation amount estimation from infrared satellite imagery and other satellite-based precipitation estimation techniques.

Figure 4:
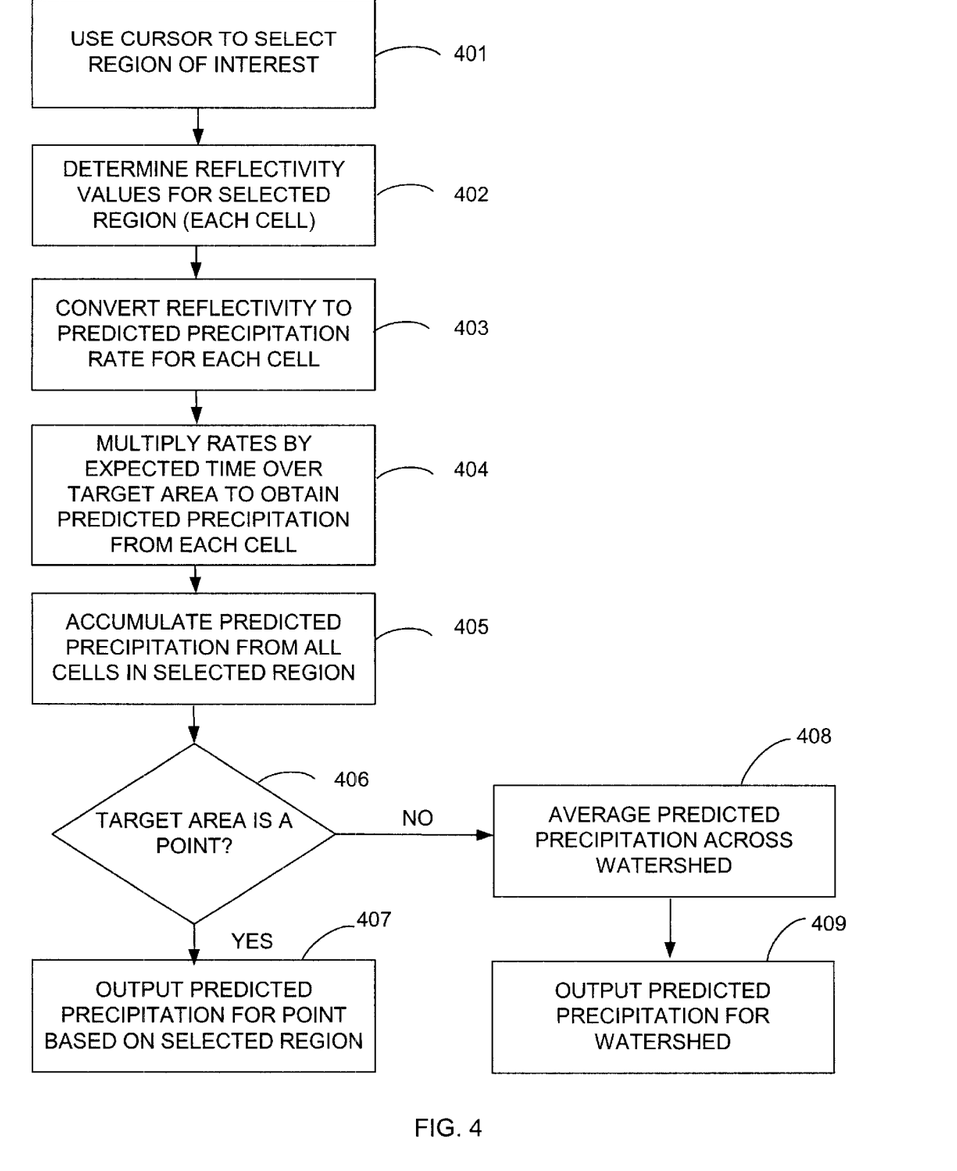
FIG. 4 shows a method including steps according to one variation of the invention.

FIG. 4 shows steps of a method in accordance with one embodiment of the invention. These steps may be carried out using a general-purpose computer programmed in accordance with the inventive principles. Beginning in step 401, a cursor is used on a computer display to select a region of interest. (Alternatively, storm cells that are likely to move over the target area can be determined automatically using a storm tracking algorithm, as explained above). In step 402, the reflectivity values for each cell in the selected region are obtained. (Alternatively, other cloud parameters indicative of potential precipitation, such as temperature readings obtained by a satellite or other means, can be used). In step 403, each reflectivity value is converted into a predicted precipitation rate, using for example the Marshall-Palmer relation.

In step 404, the precipitation rates associated with each cell that will pass over the target area are multiplied by the time that the cell is expected to remain over the target area, resulting in a predicted precipitation amount attributable to each cell. In step 405, the predicted precipitation amounts from all cells within the region of interest are accumulated into a total value. In step 406, a check is made to determine whether the target area is a point (e.g., a single cell). If so, then in step 407 the accumulated amount is output as the predicted precipitation amount. This may include displaying the amount on a computer display; sending the amount to a hydrologic model; and/or transmitting the information to another entity, such as a governmental or corporate entity. If the predicted amount exceeds an alarm limit, a flash flood warning or the like can be issued.

If in step 406 the target area is not a point, then in step 408 an average predicted precipitation amount is obtained for the entire watershed area. For example, if the watershed area consists of two cells, then the average predicted precipitation for each cell is obtained. For arbitrarily-shaped watershed areas, conventional calculus or trigonometric methods can be used to determine the area over which the precipitation should be divided. Thereafter, the result is output in step 409 as set forth above.

Although not expressly shown in the figure, precipitation amounts already recorded for the target area (e.g., as measured from a rain gauge) can be added to the future predicted amount. In this manner, a complete picture of the total (i.e., both actual so far and future predicted) precipitation can be obtained for a point, region, or watershed area.

Figure 5:
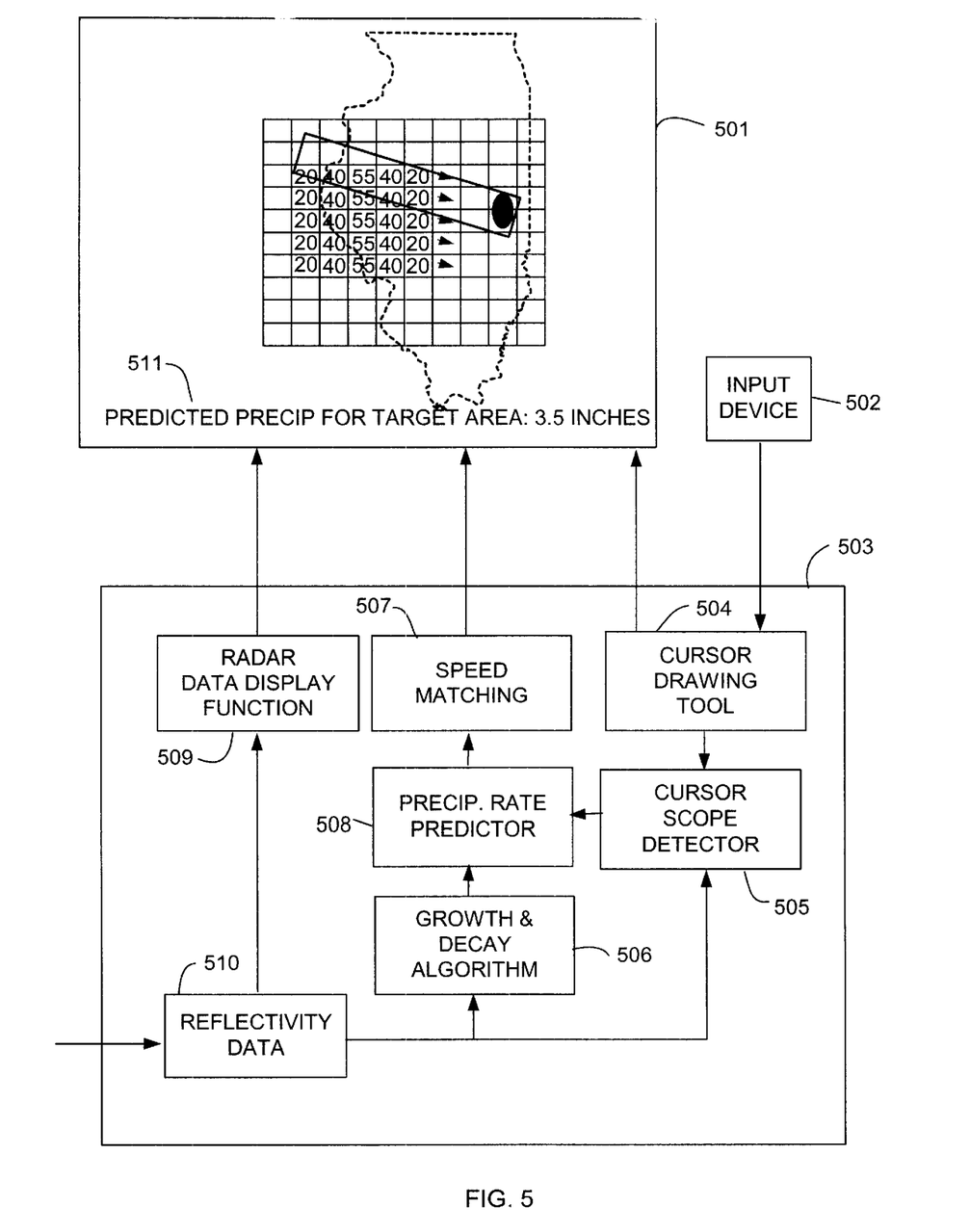
FIG. 5 shows a computer system employing various principles of the invention.

FIG. 5 shows a system employing various principles of the invention. A computer 503 is coupled to a display device 501 on which reflectivity data (or other cloud parameters indicative of potential precipitation) is displayed. Functions appearing within box 503 can be implemented in software, or some or all of the functions can be implemented in hardware. An input device 502, such as a computer mouse, is used in one embodiment to select a region of interest on the display.

The input device is coupled to a cursor drawing tool function 504, which draws on computer display 501 a shape commensurate with the user's input. In one variation, the shape may comprise a rectangle, oval, trapezoid, or any other type of shape as desired. In another embodiment, instead of shapes being displayed, the input device 502 is used to select a region of interest by indicating specific cells or groups of cells on the computer display.

Although not explicitly shown in FIG. 5, information corresponding to the current shape and/or orientation of the cursor can be displayed. For example, the distance in miles or nautical miles corresponding to the current length of the cursor can be shown, allowing a user to easily see the distance spanned by the cursor length. As the user makes the cursor longer or shorter, the corresponding length can be displayed on the computer screen. Alternatively or in addition to the distance, the prediction time corresponding to the cursor length can be determined (e.g., based on the speed of the storm and the number of cells encompassed by the cursor) and displayed. This allows the user to determine based on the cursor scope how far in advance the predicted precipitation values are valid. Various other approaches and combinations are possible. In general, it is anticipated that the cursor can be drawn in various ways to allow the user to perform "what-if" scenarios quickly and easily.

The cursor drawing tool can also be used in one embodiment to designate the target area, which may comprise a point, one or more cells, or an arbitrarily-shaped area corresponding to a watershed or other target area. Similar drawing features described above can be used to display information concerning the target area (e.g., square miles covered by the target area; terrain or other features, and the like).

Radar reflectivity data from one or more radar sources is received in computer 503 and stored in reflectivity database 510. The data can be stored in a temporary memory area or buffer; on a computer disk in various file formats; or in a commercially available database, such as a relational database. This data is displayed on computer screen 501 using a conventional radar data display function 509, although in some embodiments it need not be displayed, particularly where cell movement is predicted automatically using a cell movement algorithm. The data can be shown using conventional color-coded mapping software. (Alternatively, IR sensor data indicating temperatures or other cloud parameters can be displayed using conventional software).

The reflectivity data is also output to cursor scope detector 505, which compares the size and shape of the cursor drawn by the user with the reflectivity and cell information in database 510 to determine the reflectivity values for the selected cells, which are output to precipitation rate predictor function 508. Function 508 operates in accordance with the previously explained principles by applying a relation such as the Marshall-Palmer function to determine a precipitation rate for each selected cell (i.e., cells falling within the cursor). A speed matching function 507 applies the predicted precipitation rate to the time that the cell is expected to spend over the target area (e.g., based on the speed of the storm) and outputs a predicted precipitation amount for the target area, as shown at 511. It will be appreciated that the predicted precipitation amount can be displayed on a computer other than the one that performs the calculation. Additionally, some or all of the components and functions can be implemented over the Internet, such that some functions are performed in one computer while other functions are performed in another computer, wherein the computers are linked over a network such as the Internet.

In one embodiment, a storm tracking finction such as growth and decay algorithm 506 (see U.S. Pat. No. 5,959, 567) is used instead of cursor drawing tool 504 to determine which storm cells are expected to move over the target area. In this embodiment, reflectivity values for the cells identified by function 506 are used in the calculation.

In some embodiments, Z/R relationships can be estimated on the fly based on air mass or by using rain gauges to calculate the amount of rain that has fallen versus the reflectivity that has already passed over the gauge. Once the Z/R relationship for a given storm has been chosen, it makes it easy to calculate how much rain has already fallen over a given point or watershed and combine that calculation with a cursor-driven or predictive model forecast of how much rain is going to fall, so that the storm total precipitation can be estimated. Once the "storm total" is known, accurate and specific warnings can be created.

The inventive principles can be used with weather satellite-based precipitation estimates. An advantage of satellite techniques is that they provide rainfall estimates in regions where radar coverage is inadequate. They can also be used as a "sanity check" on radar based techniques because the latter can sometimes fail due to contamination from anomalously high reflectivity values due to the presence of hail or the melting level. The well-known Schofield-Oliver technique can used to estimate how much rain has fallen over a given point based on cloud top temperatures as sensed by weather satellites. According to the inventive principles, this technique can be extended to predict precipitation that is expected to pass over a given point or area. (This would be an alternative to step 403 in FIG. 4). Using the principles of the invention, the cursor or predictive technique can be applied to the clouds "upstream" of the rain gauge or watershed to estimate how much rain has yet to fall. This "storm total" amount can be used as the basis for a flood warning or it can be combined with a radar-based technique.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A computer-implemented method of predicting future precipitation for a target area, comprising the steps of:
   (1) storing cloud parameter values indicative of potential future precipitation for each of a plurality of cells;
   (2) selecting a group of the plurality of cells corresponding to precipitation that is expected to move over the target area;
   (3) for each of the plurality of cells determined in step (2) to correspond to precipitation that is expected to move over the target area, converting a corresponding cloud parameter value into a predicted precipitation rate;
   (4) for each of the plurality of cells determined to correspond to precipitation that is expected to move over the target area, converting the predicted precipitation rate determined in step (3) into a predicted precipitation amount; and
   (5) accumulating predicted precipitation amounts for each of the plurality of cells in step (4) into a total predicted precipitation amount for the target area.

2. The computer-implemented method of claim 1, wherein step (1) comprises the step of storing radar reflectivity values, and wherein step (3) comprises the step of converting a corresponding radar reflectivity value into the predicted precipitation rate.

3. The computer-implemented method of claim 2, wherein step (3) comprises the step of using the Marshall-Palmer relation to convert the corresponding radar reflectivity value into the predicted precipitation rate.

4. The method of claim 3, wherein step (3) is performed by converting each respective reflectivity value Z to a predicted precipitation rate R according to the relation $Z=300R^{1.4}$.

5. The computer-implemented method of claim 1, wherein step (1) comprises the step of storing satellite-based sensor information, and wherein step (3) comprises the step of converting corresponding satellite-based sensor data values into the predicted precipitation rate.

6. The computer-implemented method of claim 5, wherein step (1) comprises the step of storing infrared sensor data representing cloud temperatures, and wherein step (3) comprises the step of converting corresponding infrared sensor data representing cloud temperatures into the predicted precipitation rate.

7. The computer-implemented method of claim 6, wherein step (3) comprises the step of using the Schofield-Oliver technique to convert the corresponding infrared sensor data representing cloud temperatures into the predicted precipitation rate.

8. The computer-implemented method of claim 1, further comprising the step of displaying on a computer display the total predicted precipitation amount for the target area.

9. The computer-implemented method of claim 1, further comprising the step of electronically transmitting the total predicted precipitation amount for the target area to a governmental or corporate entity.

10. The computer-implemented method of claim 1, further comprising the step of determining whether the total predicted precipitation amount for the target area exceeds a threshold and, in response to such determination, generating a flash-flood warning for the target area.

11. The computer-implemented method of claim 1, wherein the target area comprises a point.

12. The computer-implemented method of claim 1, wherein the target area comprises a watershed.

13. The computer-implemented method of claim 12, further comprising the step of averaging the total predicted precipitation amount over an area defined by the watershed.

14. The computer-implemented method of claim 1, wherein the target area comprises an arbitrarily-shaped region, and further comprising the step of averaging the total predicted precipitation amount for the target area over the arbitrarily-shaped region.

15. The computer-implemented method of claim 1, wherein step (4) is performed by multiplying the predicted precipitation rate for each respective cell by the amount of time that the precipitation corresponding to each respective cell is expected to spend over the target area.

16. The computer-implemented method of claim 15, wherein step (4) is performed by dividing a distance corresponding to cells having predicted precipitation that is expected to pass over the target area by the speed at which the precipitation is moving.

17. The method of claim 1, wherein step (2) is performed by using a user-drawn cursor to select the plurality of cells on a computer display.

18. The method of claim 17, wherein the cursor encompasses a region of interest on the computer display indicated by a visible border.

19. The method of claim 18, wherein the cursor comprises a curved shape that generally follows a curved direction at which precipitation is moving.

20. The method of claim 1, wherein step (2) is performed by indicating individual cells on a computer display.

21. The method of claim 1, wherein step (2) is performed by using an automated storm and precipitation movement prediction algorithm that identifies cells having precipitation that is likely to move over the target area.

22. The method of claim 1, further comprising the steps of:

(a) prior to step (3), obtaining rain gauge measurements for each of a plurality of cells;

(b) prior to step (3), obtaining actual radar reflectivity measurements corresponding to the rain gauge measurements in step (a);

(c) estimating the relationship between the rain gauge measurements obtained in step (a) and the actual radar reflectivity measurements obtained in step (b); and (d) using the estimated relationship obtained in step (c) to perform the conversion in step (3).

23. The method of claim 1, further comprising the step of adding the total predicted precipitation amount obtained in step (5) to an actual measured precipitation amount over the target area and generating a value that represents a combined actual and predicted precipitation amount over the target area.

24. The method of claim 1, further comprising the step of repeating steps (2) through (5) a plurality of times to generate a plurality of different total predicted precipitation amounts, and displaying the plurality of different total predicted precipitation amounts on a computer display as different scenarios corresponding to different possible paths of a storm.

25. The method of claim 1, wherein step (2) comprises the step of drawing a cursor on a computer display and indicating in conjunction with the drawn cursor a time period over which a length of the cursor corresponds.

26. The method of claim 1, wherein step (2) comprises the step of drawing a cursor on a computer display and indicating in conjunction with the drawn cursor a distance over which a length of the cursor corresponds.

27. A computer-readable medium comprising computer-executable instructions that, when executed by a computer, perform the steps recited in claim 1.

28. A computer-implemented method of predicting precipitation over a target area, comprising the steps of:

(1) storing in a computer information indicating future potential precipitation for a cloud formation;

(2) selecting a portion of the cloud formation that is expected to move over the target area;

(3) converting potential precipitation corresponding to the portion selected in step (2) into a predicted precipitation rate;

(4) converting the predicted precipitation rate determined in step (3) into a predicted precipitation amount; and (5) displaying the predicted precipitation amount on a computer display.

29. The computer-implemented method according to claim 28, wherein step (1) comprises the step of storing radar reflectivity values, and wherein step (3) comprises the step of converting a corresponding radar reflectivity value into the predicted precipitation rate using the Marshall-Palmer relation.

30. The computer-implemented method of claim 29, wherein step (4) is performed by multiplying the predicted precipitation rate for the portion of the cloud formation by the amount of time that the portion of the cloud formation is expected to spend over the target area.

31. The computer-implemented method of claim 30, wherein step (2) comprises the step of providing a user-drawn cursor to select the portion of the cloud formation, wherein the cursor encompasses a region of interest on the computer display corresponding to the portion of the cloud formation.

32. A computer programmed with computer-executable instructions that, when executed by the computer, perform the steps of:

(1) storing information indicating future potential precipitation for a cloud formation;
(2) generating a user-selectable cursor that allows a user to select a portion of the cloud formation that is expected to move over a target area;
(3) converting potential precipitation corresponding to the portion selected in step (2) into a predicted precipitation rate;
(4) converting the predicted precipitation rate determined in step (3) into a predicted precipitation amount; and
(5) displaying the predicted precipitation amount on a computer display.

33. The computer according to claim 32, wherein the computer-executable instructions store radar reflectivity values indicating future potential precipitation for the cloud formation, and wherein the computer-executable instructions in step (3) convert a corresponding radar reflectivity value into the predicted precipitation rate using the Marshall-Palmer relation.

34. The computer according to claim 33, wherein the computer-executable instructions in step (4) multiply the predicted precipitation rate by the amount of time that the selected portion is expected to spend over the target area.

35. The computer according to claim 34, wherein the computer-executable instructions in step (2) generate a user-selectable cursor having a curved shape.

36. A computer-implemented method of predicting future precipitation for a target area, comprising the steps of:
(1) storing radar reflectivity values indicative of potential future precipitation for each of a plurality of cells over which a cloud formation is moving;
(2) displaying on a computer display the radar reflectivity values stored in step (1);
(3) with a user-drawn cursor, selecting a region of interest on the computer display corresponding to cells having precipitation that is expected to move over the target area;
(4) for each of the plurality of cells determined in step (3) to correspond to precipitation that is expected to move over the target area, converting a corresponding radar reflectivity value into a predicted precipitation rate using the Marshall-Palmer relation;
(5) for each of the plurality of cells determined to correspond to precipitation that is expected to move over the target area, converting the predicted precipitation rate determined in step (4) into a predicted precipitation amount by multiplying the predicted precipitation rate by the amount of time that precipitation for each respective cell is expected to remain over the target area;
(6) accumulating predicted precipitation amounts for each of the plurality of cells in step (5) into a total predicted precipitation amount;
(7) averaging the total predicted precipitation amount over the target area; and
(8) displaying the total predicted precipitation amount on the computer display.

37. The method of claim 21, wherein the automated storm and precipitation movement prediction algorithm comprises a growth and decay algorithm.

* * * * *